United States Patent [19]
Reeder et al.

[11] 3,873,031
[45] Mar. 25, 1975

[54] WEEPER IRRIGATION SYSTEM AND METHOD

[76] Inventors: Wilbur C. Reeder, 1961 Midwick Dr., Altadena, Calif. 91001; Norman D. Batterson, 3870 Shadow Grove Rd., Pasadena, Calif. 91107

[22] Filed: Jan. 15, 1973

[21] Appl. No.: 323,638

Related U.S. Application Data

[63] Continuation-in-part of Ser. No. 131,355, April 5, 1971, Pat. No. 3,746,263.

[52] U.S. Cl. ............................................. 239/542
[51] Int. Cl. ............................................ B05b 15/00
[58] Field of Search ........... 239/570, 571, 551, 450, 239/542, 109, 114, 115, 116, 534, 541, 272

[56] References Cited
UNITED STATES PATENTS

| | | | |
|---|---|---|---|
| 1,564,598 | 12/1925 | Maanum | 239/571 |
| 2,598,961 | 6/1952 | Andrus | 239/450 |
| 3,547,355 | 12/1970 | Salazar | 239/570 |
| 3,620,023 | 11/1971 | Schmid | 239/570;547 |
| 3,685,735 | 8/1972 | Foster | 239/542 |
| 3,693,888 | 9/1972 | Rondas et al. | 239/547 |
| 3,739,983 | 6/1973 | Jousson | 239/109 |
| 3,746,038 | 7/1973 | Simmons | 239/551 |
| 3,746,263 | 7/1973 | Reeder et al. | 239/542 |
| 3,777,980 | 12/1973 | Allport | 239/272 |

Primary Examiner—Lloyd L. King
Attorney, Agent, or Firm—Sellers and Brace

[57] ABSTRACT

A weeper type irrigation system and method featuring unusual flexibility of use and mode of assembly and the variety of results obtainable therefrom. The weeper proper is quickly installable in a self-sealing manner in the side of a plastic water distributing manifold or tube and is operable to provide either a misty spray discharge into the air or weeper flow at more than one selected rate. Alternatively, the weeper flow may be directed laterally into the air or conducted to a more remote discharge point or along the exterior of the weeper. The weepers are readily installable remote from or in close proximity to one another and each is individually operable at will to dispense water in selected manner and at a selected rate. A protective cap is installable with a snap fit over the outer end and selectively adjustable thereon to provide fast or slow weeper flow as well as to convert the discharge between a confined flow at either a slow or fast rate and into a widely dispersed misty spray or a confined flow. A simple tool functions to punch or blank a disc from the plastic water distributing manifold into which the weeper is then installable with a self-sealing self-retaining fit with the axis of the weeper supported upwardly with a captive pressure-responsive valve free for movement between several different operating positions.

41 Claims, 14 Drawing Figures

PATENTED MAR 25 1975 3,873,031

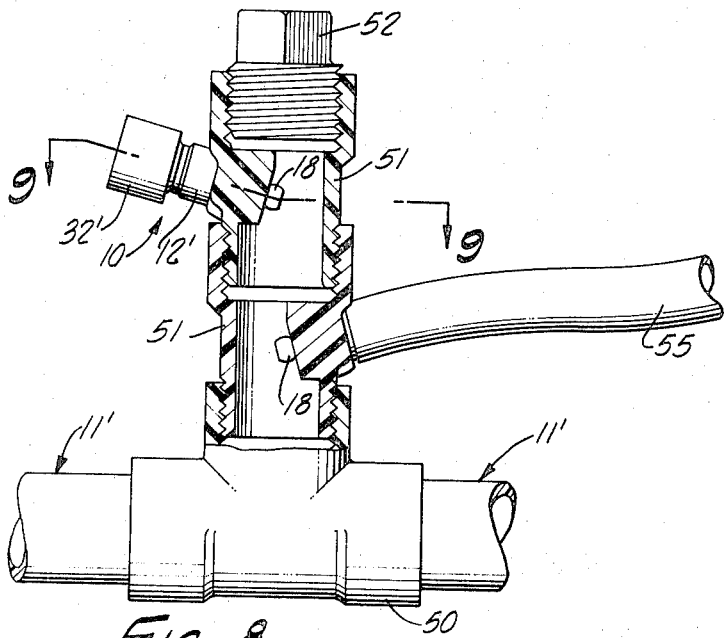
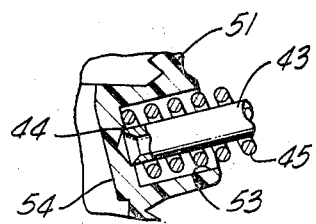
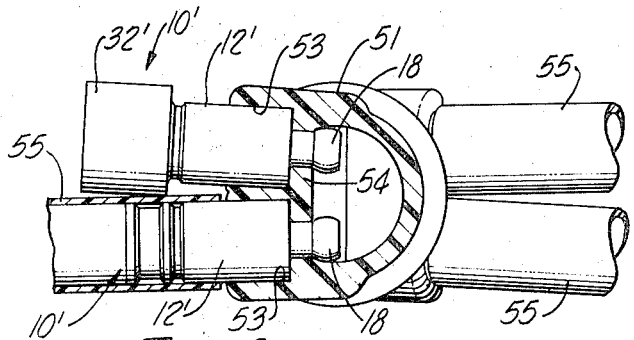
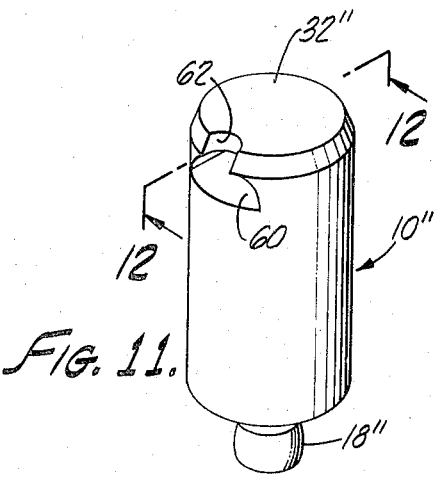
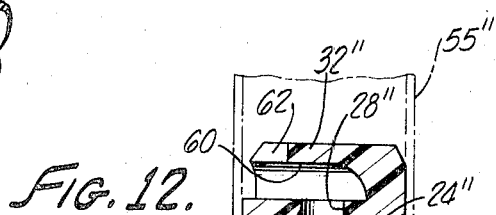
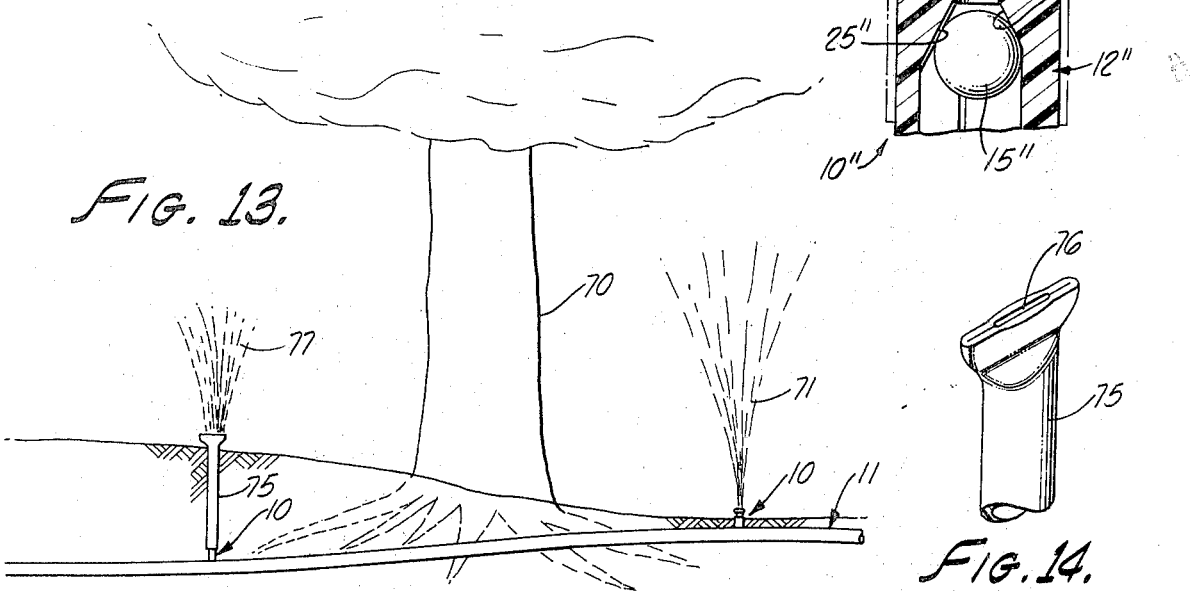
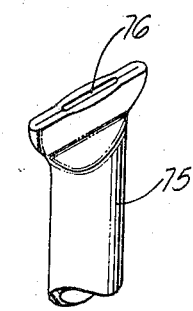

WEEPER IRRIGATION SYSTEM AND METHOD

This invention is a continuation-in-part of our copending application for U.S. Pat. Ser. No. 131,355, filed Apr. 5, 1971, now U.S. Pat. No. 3,746,263.

This invention relates to weeper type irrigation systems and more particularly to an improved system and method utilizing simply constructed inexpensive components readily installed in a plastic water distributing manifold and operable in a variety of modes making economical highly-efficient use of water to irrigate as well as to humidify the ambient air and provide frost and temperature control for trees, shrubs and plant life generally.

A variety of proposals have been advanced for distributing a small continuous flow of water to trees and plant life in a manner making frugal and provident use of a limited water supply. There are many arid areas found suitable for agricultural and fruit growing purposes when utilizing new and improved weeper techniques for utilizing to maximum efficiency limited supplies of irrigation water.

Such proposals involve locating weeper outlets at spaced points along a water distributing main selected for the most effective irrigation of the roots of plant life. However, such outlets are subject to divers problems including multiplicity of parts, excessive cost, laborious and time consuming installation problems, clogging and malfunctioning in use, lack of versatility to provide different rates and types of water discharge, need for interrupting operation of the system during servicing and numerous other problems of a related nature.

The foregoing and other shortcomings of prior weeper constructions and methods are avoided by the present invention which is characterized by its simplicity low cost, ease of installation and modification, the variety of modes of use and the ease with which it can be converted from one mode of use to another, including widely varying flow rates and radically different modes of discharging the water not only for irrigation purposes but to control humidity and temperature conditions in the general vicinity of the weeper device. Both the water distributing manifold and the weeper device are preferably formed inexpensively from semi-rigid or rigid plastic material. The weeper device per se comprises an inlet tube having a self-sealing self-retaining fit with a mounting hole punched through the side of the plastic distributing manifold. A ball or the like type of valve is held captive within the tubular housing and is responsive to gravity to seat against a valve seat near its inlet end and responsive to flowing pressurized water to seat against an outer weeper valve seat. At least one and preferably a plurality of minute flow passages are formed in the latter seat and converge toward the outlet opening in a manner effective to create a misty spray of the small flow permitted so long as the water pressure holds the valve seated across the weeper or outer seat. If not obstructed, the resulting misty spray may extend to a height of several feet before falling to the ground in a widely dispersed manner. Such a spray is not only effective for irrigation purposes but to humidify dry air as well as to control the air temperature under incipient frost conditions.

A protective guard cap having a snap fit over the outlet end is effective when in one installed position to invert this spray discharge to a flow occurring along the exterior side of the weeper and thence into the ground. If the cap is pressed to a second position, it holds the valve off the valve seat and allows a substantially greater flow for increased irrigation and also effective to flush the restrictive flow passages. Flushing of these passages may also be accomplished by temporarily unseating the valve by holding the cap depressed before restoring it to the normal weeper operating position. Alternatively, flushing is readily accomplished without the cap and without interfering with the operation of the remainder of the system simply by blocking flow as by holding the finger pressed against the outlet briefly. This allows the pressure to equalize on the opposite sides of the valve whereupon the valve gravitates to the inlet end of the weeper. Removal of the finger then restores flow abruptly at a high rate to flush the passages with an augmented flow of pressurized water until the valve reseats.

Accordingly, it is a primary object of the present invention to provide an improved low cost weeper type irrigating device and method of unusual versatility.

Another object of the invention is the provision of a weeper device adapted to be installed with a self-retaining, self-sealing fit at any selected point along a pressurized plastic water distributing manifold.

Another object of the invention is the provision of a weeper irrigating device operating selectively to provide a fine mist discharge or a stream discharge which is selectively confined to the immediate area of the device or conducted to some remote discharge point.

Another object of the invention is the provision of a self-purging weeper type irrigating device having simple provision for operating the same selectively at different rates and in different modes including a spray discharge upwardly into the air or in a confined stream.

Another object of the invention is the provision of a low-cost simple molded plastic weeper provided with fine weeper passages cooperating with a pressure responsive valve to provide a spray weeper discharge as well as a more rapid non-spray type flow at other times.

Another object of the invention is the provision of a weeper type irrigating device provided with a flow responsive valve normally seated in a manner providing a weeper flow at a rate not in excess of a few gallons per hour and including provision for discharging this flow as a fine mist into the air and alternatively directing the discharge into the ground either adjacent the weeper device or at a selected area remote therefrom at the user's option.

Another object of the invention is the provision of a simple weeper irrigating device installable in a plastic water distributing manifold simply by pressing the inlet end of the weeper into a snug fitting hole in the side of the manifold.

Another object of the invention is the provision of a weeper irrigating device having a snap fit with a protective cap readily adjustable to either of two positions each effective to modify the type and rate of flow.

Another object of the invention is the provision of a weeper flow control device installable in a plastic manifold by punching a small disc from the side of the manifold and pressing the inlet end of the weeper device through the hole until a bead embracing the inlet tube is located adjacent the inner end thereof.

Another object of the invention is the provision of a simple punching tool having a blanking tube provided with a sharp rimmed end sized to punch a small disc from a plastic manifold having a snug frictional fit with the inlet end of a weeper flow control device.

Another object of the invention is the provision of a weeper irrigating system having outlets selectively usable to control the air temperature and provide frost protection for trees in the immediate vicinity or, altenatively, to irrigate only the subsurface around the base of a tree.

Another object of the invention is the provision of an irrigating water distributing manifold including simple fittings usable alone or in multiples and installable along the manifold and each adapted to support one or more weeper flow control devices.

Another object of the invention is the provision of a weeper type water distributing manifold having provision for supporting one or more short fittings in a branchout connection which fittings are adapted to support one or more weeper flow control devices with their discharge end at a higher elevation than their inlet ends.

These and other more specific objects will appear upon reading the following specification and claims and upon considering in connection therewith the attached drawing to which they relate.

Referring now to the drawing in which a preferred embodiment of the invention is illustrated:

Figure 3:
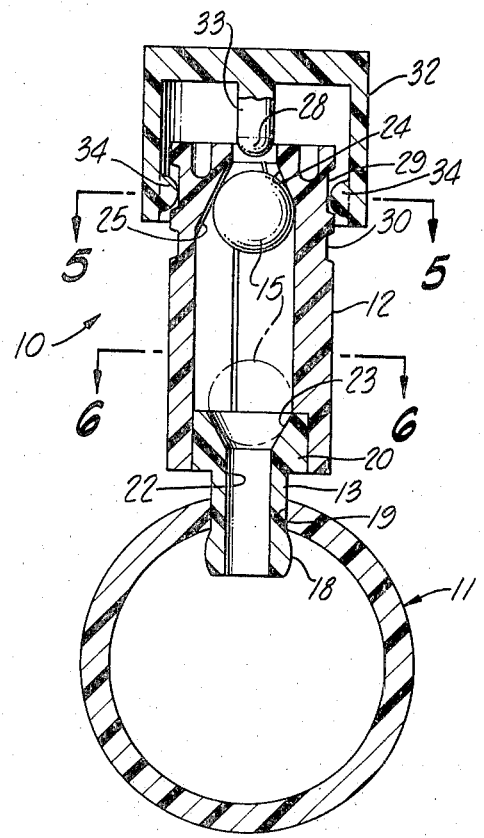
FIG. 3 is a cross sectional view on an enlarged scale taken along line 3—3 on FIG. 2 with the protective cap positioned to direct a limited weeper flow downwardly along the exterior of the weeper.
Figure 7:
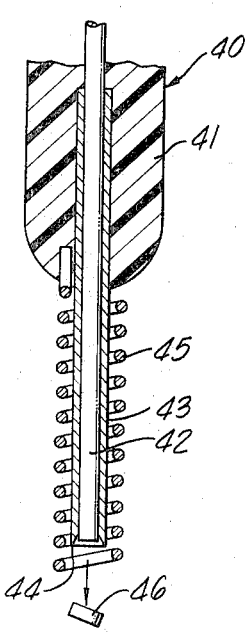
Figure 5:
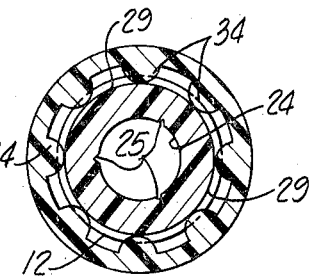
Figure 6:
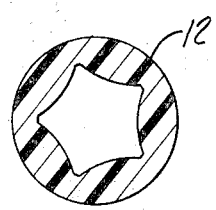
Figure 4:
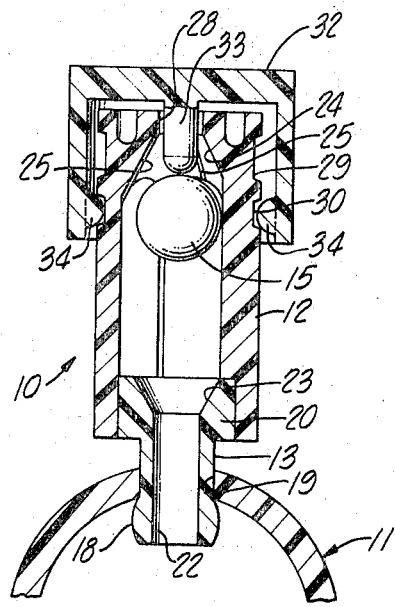
FIG. 4 is a view similar to FIG. 3 but showing the protective cap adjusted to a second position providing an increased irrigating flow along the exterior of the device.

FIGS. 5 and 6 are cross sectional views taken along line 5—5 and 6—6 respectively on FIG. 3;

FIG. 7 is a fragmentary view of the assembly blanking tool with the plunger depressed to remove the punch-out disc;

FIG. 8 is a fragmentary view of a modified water distributing manifold with portions broken away and showing a plurality of the weeper devices assembled to the manifold in close proximity to one another;

FIG. 9 is a cross sectional view on an enlarged scale taken along line 9—9 on FIG. 8;

FIG. 10 is a fragmentary view on an enlarged scale showing the blanking tool in use to provide a mounting opening for a weeper device in a modified manifold construction;

FIG. 11 is a perspective view of an alternate weeper device having the protective hood formed integrally with the main body of the weeper;

FIG. 12 is a fragmentary cross sectional view taken along line 12—12 on FIG. 11;

FIG. 13 is a view showing two different modes of mounting the weeper device in the distributing manifold at the base of a tree and;

FIG. 14 is a fragmentary perspective view on an enlarged scale of one of the weeper outlets shown In FIG. 13.

Referring initially more particularly to FIGS. 1–4, there is shown an illustrative embodiment of the invention weeper device, designated generally 10, installed in a plastic water distributing manifold 11. Device 10 includes a tubular main body 12 bonded or otherwise suitably secured to an inlet tube 13. Manifold 11 typically comprises a semi-rigid plastic tube of any suitable plastic composition, such as polyvinyl chloride and others having similar characteristics. Main body 12 may be molded or otherwise formed from similar plastic material and is formed interiorly with a suitable non-circular configuration, such as that indicated at FIG. 6, so as to hold a valve 15 freely captive between the opposite ends of the main body. Inlet tube 13 is preferably provided with a low radial height bead or retainer 18 embracing its inlet end and cooperating with the rim edges of the mounting opening 19 to hold the weeper device separably assembled to the manifold 11.

The flanged discharge end 20 of the inlet tube has a snug fit with the adjacent end of main body 12 and is preferably bonded or heat sealed thereto. The discharge end of the flow passage 22 through tube 13 is formed with a conical valve seat 23 against which the valve seats under conditions to be described below.

The upper end of weeper housing 12 converges to provide a generally conical valve seat 24 for valve 15. This valve seat is provided with at least one and preferably three or more fine weeper passages 25. As shown in FIG. 5 there are three passages 25 comprising shallow V-shaped grooves having a depth, such as five to eight mils, and having a combined flow capacity of one to three gallons per hour when valve 15 is firmly seated on its seat 24.

The upper smaller end of valve seat 24 opens into an outlet or discharge port 28. If there is no obstruction in the zone of the outlet port 28, the fine pressurized streams of water passing along weeper passages 25 impinge upon one another outwardly of port 28 and convert the flow into a spray-like mist of water typically extending three to five feet forwardly of port 28.

The exterior upper end of housing 12 is provided with two shallow annular grooves 29 and 30 usable to retain a protective cap or guard 32 on the upper end of the weeper fitting in either of two adjusted positions axially of the weeper. Cap 32 is preferably molded from supple plastic material and includes a post 33 extending axially from the bottom of the cap and having a diameter appreciably smaller than the water discharge port 28. Caps 32 may be made with posts 33 of differing diameters to provide for different rates of augmented flow. The interior sidewalls of cap 32 are also provided with a series of dome-like projections 34 best shown in FIG. 5. These projections seat loosely within either of the retaining grooves 29,30 and serve to hold the protective cap 32 firmly assembled to the weeper in either position respectively illustrated in FIGS. 3 and 4. If the protuberances 34 are seated in groove 29 as they are in FIG. 3, then the post 33 is positioned above valve 15 and the latter is free to seat firmly against the conical seat 24 under the system water pressure. However, if cap 32 is depressed until bulges 34 snap into seating engagement with groove 30, then post 33 holds valve 15 depressed and fully unseated thereby allowing the considerably increased flow of water to escape through port 28 which is then diverted downwardly along the exterior sides of the weeper by the sidewalls of cap 32. As will be readily recognized the rate of flow under these conditions is governed primarily by the relative diameters of post 33 and port 28. It will be understood that cap 32 has a snap fit over the outer ends of the weeper and is loosely retained in either the outer retaining groove 29 or the inner retaining groove 30 at the option of the user and having important functions and purposes to be described presently.

Figure 1:
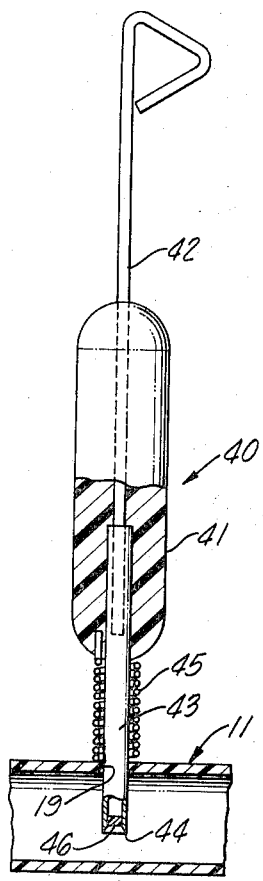
FIG. 1 is a view partially in section showing the invention installation tool in use to blank an opening in a distributing manifold for the installation of a weeper flow control device.
Figure 2:
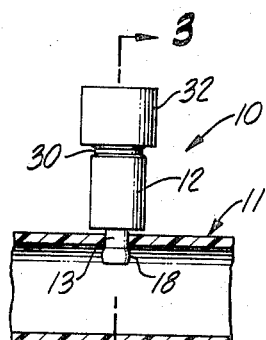
FIG. 2 is a view similar to FIG. 1 after the blanking tool has been removed and showing a weeper device embodying the invention installed in the manifold.

The weeper is quickly and easily mounted at any selected point along manifold 11 utilizing the simple blanking tool indicated at 40 in FIGS. 1 and 7. This tool includes a handle 41 frictionally supporting a plunger 42 the inner end of which is freely slidable lengthwise of a blanking tube 43. The sharpened rim edge 44 of the latter is sized to punch an opening through the sidewall of manifold 11 sufficiently smaller than the external diameter of the weeper inlet tube 13 that the latter has a snug frictional fit therewith. Desirably, a suitble guard such as a compression spring 45 surrounds the blanking tube 43 and normally projects beyond the free end of this tube, thereby protecting the sharp edge 44 against damage or injury to the user. However, when the tool is placed against the sidewall of manifold 11 the spring readily compresses as the tool is depressed through the sidewall of the manifold. The interior of the blanking tube retains the punchout disc 46 (FIG. 1) captive until after the tool is withdrawn from the manifold after which plunger 42 is employed to eject and discard the punchout disc 46.

The tool having withdrawn from the newly formed hole 19 in the manifold, the operator merely presses the inlet tube 13 of a weeper device 10 into the newly formed opening until bead 18 snaps into sealing position opposite the inner end of hole 19. The sidewalls of hole 19 in cooperation with bead 18 then retain the weeper device firmly installed on the manifold in a fluidtight manner.

Referring now to FIGS. 8–10, there is shown a modified embodiment wherein the same or similar components are designated by the same reference characters distinguished by a prime. The water distributing manifold 11' includes a T-fitting 50 having its T-head interconnecting two adjacent sections of the manifold and supporting in its T-stem a pair of similar couplings 51,51 the upper one of which is closed by plug 52. It will be understood that any desired number of couplings 51 may be connected in series depending upon the number of weeper outlets to be accommodated.

Each of couplings 51 is here shown as provided in its sidewall with a pair of cup-shaped wells 53,53 each having a normally closed bottom 54. Desirably, wells 53 are sized to have a snug supporting fit with the main body 12' of a weeper device 10'. When it is desired to mount a weeper in coupling 51 the operator uses the tool 40 shown in FIGS. 1 and 7 to blank a hole through the bottom 54 of the selected mounting well 53. Thereafter, he simply presses the inlet of a weeper device 10' into its installed position, the protective cap 32' being adjusted to a desired position or removed at the user's option and depending upon the nature of the irrigation operation to be performed.

Not infrequently, multiple weeper outlets at a particular location are utilized to supply extra quantities of irrigating water to different dispersing points. This is readily carried out by removing the protective cap 32' and telescoping a resilient flexible tube over the outer end of weeper device 10'. This tube has a snug fluidtight fit with the weeper and its outlet end may be located any desired distance from the weeper. If the user desires a misty spray discharge, he removes the cap 32' allowing the weeper flow to discharge into the air; otherwise, the cap is present in one of its two adjusted positions.

To be noted in particular is the face that couplings 51 are usually located in an upright position, as indicated in FIG. 8, in order to insure that the ball valve 15 will always gravitate to its lower seat 23 in the absence of water pressure or if the pressure on the opposite sides of the valve is the same. To this end the axes of the mounting wells 53 are preferably arranged at a suitable angle to the horizontal, such as 15°. However, it will be understood that this angle may be increased if it is desired to have the weepers discharge in a more nearly vertical direction.

Referring now to FIGS. 11 and 12, there is shown a modified embodiment of the weeper device, designated generally 10", and differing from the first described embodiment only in the fact that the protective cap 32" is molded integrally with the main body 12" and is provided with a laterally directed outlet port 60 through which the water discharges. If it is desired to direct the water to a different area, a flexible tube 55" is telescoped over the weeper outlet and the water escaping along passage 60 exits through the notch 62 and is conducted by the tube to its discharge end.

Purging of the weeper passages 25" is accomplished by collapsing tube 55" to block the discharge of water temporarily. The tube must be held collapsed for a sufficient period for the water pressure to equalize on the opposite sides of ball valve 15" whereupon the valve gravitates back to its lower seat 23. The collapsing pressure is then removed from the tube permitting abrupt resumption of water flow at a maximum rate past valve 15" to cleanse the weeper passages 25" in the same manner as described above in connection with FIGS. 1–7.

Referring now to FIGS. 13 and 14, the water distributing manifold 11 is shown in a typical mode of use with different portions buried to different depths adjacent the trunk of a tree 70. The right hand end of the manifold is scarcely covered by earth thereby leaving the upper end portion of weeper device 10 with cap 32 detached exposed and discharging a misty spray 71 into the vicinity of the lower branches of the tree. The left hand end of the manifold is buried to a depth of several inches and telescoped over its upper end in lieu of cap 32 is a short length of plastic tubing 75 the upper end of which is shown flattened and heat sealed in this condition except for a ribbon-like discharge port 76 sized to provide either a misty spray as indicated at 77 or a non-jetting discharge. Thus, if the port is made somewhat larger than that producing a spray discharge, the water simply overflows the rim of the port and downwardly along the exterior of tube 75. This mode of weeper discharge permits burying the manifold to a depth avoiding risk of injury by cultivating tools and also discourages vandalism and tampering by strangers.

The versatility and various modes of utilizing the invention irrigating system will be readily apparent from the foregoing detailed description of its construction and mode of installation. All parts are formed of inexpensive plastic material highly resistant to damage and injury. The main distributing manifold may be laid along the surface of the ground or buried only slightly or to a sufficient depth to avoid injury by agricultural tools. Usually the weeper proper is located close to the base of a tree or other plant life to be irrigated. The irrigation may be either at a slow rate of 1 to 3 gallons per hour or at a more rapid rate. Additionally the water may be discharged as a fine spray several feet into the air or may be confined strictly to the immediate vicinity of the weeper as its issues therefrom. If it is desired to confine the discharge to the subsurface, then the protective cap 32 is employed and the weeper device is buried to a desired depth including an earth or other covering to one or more inches. In this case a visible marker is usually placed in the ground close to the location of the weeper for ease of location for servicing and adjustment of the flow rate.

If greater versatility is desired, then one or more of couplings 51 are employed and the bottoms of the mounting wells 53 are pierced and equipped with weeper devices when and as needed. If additional outlets are needed it is merely necessary to remove the end plug 52 and install an additional coupling.

A relatively rapid or leaching water flow is readily obtained simply by snapping cap 32 to its innermost adjusted position so that post 33 holds valve 15 unseated and permits a substantially greater flow. This flow may be further regulated simply by substituting a cap having a larger or smaller post 33 thereby varying the quantity of water which can pass between the sides of the post and the walls of the outlet port 28.

When an orchard equipped with the invention irrigating system is threatened with frost conditions, protective caps 32 are removed providing a high level misty spray reaching up to the lowermost branches of the tree. This mode of use is found very effective in safeguarding against mild frost conditions and avoids the use of costly heater equipment. A similar mode of use in hot weather is found very effective in protecting trees and shrubs against very low humidity and the serious dessication which can result under low humidity conditions particularly when accompanied by winds.

While the particular improved weeper irrigation system and method herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

We claim:

1. That improvement in a weeper type irrigation system of the type having plastic tubing for distributing pressurized water to an area to be irrigated, tubular weeper means having an inlet end projecting through the sidewall of said plastic tubing with a self-sealing fit occurring automatically as an incident to the insertion of said weeper means, said weeper means having a relatively large area water outlet opening at the opposite end thereof from said inlet end, valve seats facing one another from the inner ends of said inlet and outlet openings, a valve held loosely captive between said valve seats and seatable by gravity on the valve seat at said inlet end when said plastic tubing is not pressurized and being automatically shiftable into fixed seating engagement with said valve seat at said outlet opening so long as water in said tubing is pressurized, and one of said valve seats having a bleeder water flow passage thereacross effective to limit water flow through said irrigation system so long as said valve is seated on said one valve seat.

2. That improvement defined in claim 1 characterized in the provision of protective guard means disposed across the outer end of said water outlet opening and cooperating therewith to provide a flow passage.

3. That improvement defined in claim 2 characterized in that said protective guard means is adjustable axially of the outer end of said outlet opening.

4. That improvement defined in claim 2 characterized in that said protective guard means is integral with the outer end of said tubular weeper means and formed to direct the discharging water laterally of said outer end.

5. That improvement as defined in claim 2 characterized in that said protective guard means is cup-shaped and telescoped loosely over the outlet end of said weeper means, means for holding said protective guard means assembled to said weeper means selectively in either of two positions, and means whereby when said guard means is in the first of said positions said valve is seated on said valve seat at the inner end of said outlet opening and in the second of which positions said valve is held unseated to permit a substantially greater flow of water.

6. That improvement defined in claim 2 characterized in that one of said protective guard and said valve means includes means extending axially of said outlet opening and operable when moved axially inwardly therealong to hold said valve unseated from said valve seat.

7. That improvement defined in claim 1 characterized in that said weeper means has a tubular inlet end formed with an annular bulge about its exterior adapted to be forcibly inserted through an opening in the side of said plastic tube and thereafter to seat against the inner rim edge of said last mentioned opening to hold said weeper means assembled to said plastic tube in a fluidtight manner.

8. That improvement defined in claim 1 characterized in that said weeper means has a reduced diameter inlet end having a length substantially greater than the wall thickness of said plastic tubing and encircled at its free outer end with a low-height annular bead adapted to be forcibly inserted through an opening in the sidewall of said plastic tubing and thereafter effective to retain said bleeder means snugly but separably assembled therein without need for fastener means.

9. That improvement defined in claim 1 characterized in that said weeper means includes a tubular extension assembled over said outlet opening, the outer free end of said tubular extension being flattened to provide a narrow ribbon-like outlet effective to provide a misty spray discharge.

10. That improvement in a weeper type irrigation system of the type having plastic tubing for distributing pressurized water to an area to be irrigated, said tubing including a portion having a cup-like receptacle formed in the exterior surface thereof and having a normally imperforate bottom, tubular weeper means having a restricted outlet port adjacent one end thereof and enclosing a non-flexible captive valve interiorly thereof adapted to be held immovably seated against the inner end of said outlet port by pressurized water and cooperating with said outlet port to limit the escape of water therefrom, tubular means projecting axially from the opposite end of said weeper means from said outlet port adapted to be secured to a hole formed through the bottom of said cup-like receptacle, and said tubular means and the adjacent end of said weeper means having a snug fit respectively with said hole and with the interior surface of said cup-like receptacle.

11. That improvement defined in claim 10 characterized in that said plastic tubing is formed with a plurality of said cup-like receptacles in close proximity to one another each having a closed bottom adapted to be perforated for assembly thereto of an individual one of said weeper means.

12. That improvement defined in claim 10 characterized in that a length of flexible tubing is telescoped over the outer end of said weeper means with its outer end spaced remotely from said weeper means.

13. That improvement defined in claim 10 characterized in that said cup-like receptacle is formed in a short length of plastic tubing having internal threads at one end and external threads at its opposite end and respectively located on the opposite sides of said cup-like receptacle.

14. That improvement defined in claim 1 characterized in that said valve is spherical and held loosely captive within an elongated flow passage of non-circular cross-section interiorly of said weeper means.

15. That improvement in a weeper type irrigation system which comprises plastic tubing for distributing pressurized water along an area to be irragated, tubular weeper means in communication with the interior of said plastic tubing through a tubular inlet neck of semi-rigid material having a snug press fit axially of an opening in the sidewall of said tubing and including a bead embracing the exterior of said neck adjacent the inner rim edge of the opening to which said inlet neck is assembled, said bead and the snug fit of said inlet neck with the opening through said tubing cooperating to hold said weeper means assembled to said tubing in a fluid tight manner under pressurized water operating conditions, and the outlet end of said weeper means including valve means cooperating therewith effective to limit the flow of water therefrom.

16. That improvement defined in claim 15 characterized in that said bead is crowned transversely thereof to facilitate forced assembly and disassembly of said weeper means with respect to said plastic tubing.

17. That improvement defined in claim 15 characterized in that said weeper means includes an axially elongated valve chamber provided at its opposite ends with valve seats facing forward one another, flow-responsive valve means freely movable into seating engagement with either of said valve seats, and said valve means being effective to limit but not prevent flow therepast when seated against one of said valve seats.

18. That improvement defined in claim 17 characterized in that said valve means is adapted to form a fluid-tight seal when seated against the other one of said valve seats.

19. That improvement defined in claim 15 characterized in the provision of protective cap means having a loose snap fit over the outlet end of said weeper means to preclude the entrance of foreign matter but freely passing a weeper flow of water escaping from said outlet end.

20. That improvement defined in claim 15 characterized in the provision of protective cap means having a loose telescopic fit over the outer end of said weeper means and including cooperative means for holding said cap assembled selectively in first and second positions axially of said weeper means.

21. That improvement defined in claim 20 characterized in that said cap and said valve means include means whereby said valve means is effective to restrict water flow therepast when said cap is in said first assembled position and whereby said valve means is held positively in position to permit a substantially increased flow therepast when said cap is in said second assembled position.

22. A weeper type irrigating device comprising a tubular housing having an inlet connectable to a source of pressurized water and a ported outlet formed at its inner end with an outlet valve seat coaxially of said ported outlet formed with minute water flow passage means therealong cooperating with freely-movably loosely-supported non-flexible captive valve means within said housing to provide a minute continuous fine spray mist of water when said device is connected to a source of pressurized water.

23. A weeper device as defined in claim 22 characterized in that said outlet valve seat converges outwardly and in that said flow passage means comprises a plurality of channels formed in the surface thereof and open along their inwardly facing sides.

24. A weeper device as defined in claim 22 characterized in that said valve means comprises a ball held captive between the opposite interior ends of said tubular housing.

25. A weeper device as defined in claim 22 characterized in the provision of loose-fitting cap means mountable over the discharge end of said device for inverting the flow of water therefrom into a flow along the exterior of said device.

26. A weeper device as defined in claim 22 characterized in the provision of means adjustably supported over the discharge end of said device and selectively adjustable to a plurality of positions in at least one of which the flow of water is inverted and in at least a second of which said means is effective to depress said valve and increase the flow of water past said valve very substantially.

27. A weeper device as defined in claim 22 characterized in the provision of cap means adapted to be held detachably assembled over the discharge end of said device selectively in first and second positions, said cap means being effective in the first of said positions to invert the spray flow to a flow along the exterior of said device, and effective in the second of said positions to hold said valve means unseated from said valve seat to permit a very substantially increased flow of water therepast.

28. A weeper device as defined in claim 22 characterized in that said water inlet includes a short small diameter tube shaped and sized to have a self-sealing forced fit in an opening in the side of a plastic tubular water distributing member and which self-sealing fit occurs automatically as an incident to the insertion of said tube into said opening.

29. A weeper device as defined in claim 22 characterized in that the water inlet includes a short small diameter tube formed near one end with an annular bead embracing the exterior thereof, said tube having a forced press fit through a hole in the side of a plastic tube connectable to a source of pressurized water with said bead being located against the inner end of said hole and cooperating therewith to hold said device assembled to said plastic tube.

30. A weeper device as defined in claim 29 characterized in that the other end of said plastic tube is telescoped and held permanently assembled to one end of said tubular housing.

31. A weeper device as defined in claim 29 characterized in that said plastic tube is formed with plurality of cup-shaped wells inclined acutely to a plane normal to the axis of said tube and the bottoms of each of which are adapted to be pierced to provide a forced pressed fit with the exterior of said small diameter tube at the inlet end of an individual one of said weeper devices.

32. A weeper device as defined in claim 22 characterized in that said tubular housing is formed in a plurality of plastic parts including a main body tube and a small diameter inlet tube having an externally flanged end inseparable from one end of said main body tube.

33. A weeper device as defined in claim 32 characterized in that the discharge end of said inlet tube is provided with a conical valve seat facing toward said first mentioned valve seat.

34. A weeper device as defined in claim 22 characterized in that said valve means comprises a ball held captive between and seatable against either of said valve seats.

35. A weeper type irrigating device comprising a tubular housing having an inlet end connectable to a source of pressurized water and an outlet end provided with an annular valve seat provided with at least one weeper flow passage an elongated valve chamber within said tubular housing, a non-flexible valve member held loosely captive within said valve chamber freely movable between the opposite ends thereof when not supplied with pressurized water and adapted to be held normally immovably against said valve seat by water pressure to provide a weeper flow therepast and responsive to gravity to move backwardly off said valve seat and to the inlet end of said elongated valve chamber upon cessation of flow, whereby abrupt restoration of water flow provides a burst of pressurized water flow effective to purge said weeper flow passage of foreign matter while said valve is moving back into seating engagement on said valve seat.

36. That improvement in a weeper type irrigation system having plastic tubing for distributing pressurized water to an area to be irrigated, tubular weeper means having an inlet end projecting through an opening in the sidewall of said plastic tubing, said weeper means having a relatively large area outlet opening on the end thereof remote from said inlet end and provided at its inner end with a valve seat having a restrictive water flow passage thereacross, a valve held loosely captive within said weeper means with freedom to move axially of the interior of said weeper means under non-pressurized conditions but adapted to be held seated on said valve seat by pressurized water in said tubing thereby to limit flow from said weeper means to that taking place along said restrictive flow passage, protective cap means including means for holding the same selectively assembled over the outlet end of said weeper means in first and second positions in the first of which said cap means is effective to hold said valve unseated from said valve seat and in the second of which positions said valve is fully seated on said valve seat and effective to limit water flow to that occurring along said restrictive flow passage.

37. That improvement defined in claim 36 characterized in that said protective cap means includes an axial post on the interior bottom thereof positioned to pass loosely through said outlet opening and effective to engage and hold said valve off the valve seat of said outlet opening as said cap means is shifted from the first to the second position thereof.

38. That improvement defined in claim 36 characterized in the provision of resilient detent means on said guard cap means and said weeper means for retaining said guard cap means selectively but releasably in one of said first and second positions.

39. That improvement defined in claim 36 characterized in that the inlet end of said weeper means has a fluid-tight interference fit with the sidewall of an opening through the sidewall of said plastic tubing, and said inlet end having a low height bead embracing the same closely adjacent the interior surface of said plastic tubing and effective to hold said weeper means in assembled position unless and until forcibly withdrawn from its assembled position.

40. That improvement defined in claim 36 characterized in thatprotective guard cap means is cup-shaped and molded from supple elastomeric material, and the sidewalls of said cap means having a loose fit over the outlet end of said weeper means permitting a free flow of water from said weeper means in both said first and second positions of said cap means.

41. That improvement defined in claim 36 characterized in that said guard cap means includes a post positioned to extend through said outlet opening and hold said valve unseated from the valve seat for said outlet opening thereby to provide a substantially increased flow of water past said valve seat to purge the same of foreign matter.

* * * * *